US010801920B2

(12) United States Patent
Mies et al.

(10) Patent No.: US 10,801,920 B2
(45) Date of Patent: Oct. 13, 2020

(54) DEVICE WITH A TACTILE SYSTEM AND WITH A CONTACTLESSLY OPERATING SENSOR, AND CORRESPONDING METHOD AND USE THEREOF

(71) Applicant: Klingelnberg GmbH, Hückeswagen (DE)

(72) Inventors: Georg Mies, Wipperfürth (DE); Christof Gorgels, Cologne (DE)

(73) Assignee: Klingelnberg GmbH (CH)

( * ) Notice: Subject to any disclaimer, the term of this patent is extended or adjusted under 35 U.S.C. 154(b) by 246 days.

(21) Appl. No.: 16/111,516

(22) Filed: Aug. 24, 2018

(65) Prior Publication Data

US 2019/0064031 A1    Feb. 28, 2019

(30) Foreign Application Priority Data

Aug. 25, 2017   (DE) .................... 20 2017 105 125 U (51) Int. Cl.

| | |
|---|---|
| *G01M 13/021* | (2019.01) |
| *G01B 5/28* | (2006.01) |
| *G01B 11/24* | (2006.01) |
| *G01B 21/04* | (2006.01) |
| *G01B 5/20* | (2006.01) |
| *G01N 21/84* | (2006.01) |

(52) U.S. Cl.
CPC ........... *G01M 13/021* (2013.01); *G01B 5/202* (2013.01); *G01B 5/28* (2013.01); *G01B 11/2416* (2013.01); *G01B 21/047* (2013.01); *G01N 21/84* (2013.01)

(58) Field of Classification Search
None
See application file for complete search history.

(56) References Cited

U.S. PATENT DOCUMENTS

| | | | | |
|---|---|---|---|---|
| 4,964,071 | A * | 10/1990 | Grosvenor | G01B 7/12 |
| | | | | 702/157 |
| 8,701,298 | B2 * | 4/2014 | Jordil | G01B 21/047 |
| | | | | 33/503 |
| 9,453,716 | B2 * | 9/2016 | Kurahashi | B23Q 17/2457 |
| 9,903,713 | B2 * | 2/2018 | Featherstone | G01B 21/047 |
| 10,539,407 | B2 * | 1/2020 | Mies | G01B 5/28 |
| 2011/0083497 | A1 | 4/2011 | Matsumiya et al. | |
| 2018/0128596 | A1 * | 5/2018 | Mies | G01B 11/007 |
| 2019/0375066 | A1 * | 12/2019 | Suzuki | B23Q 3/1554 |

FOREIGN PATENT DOCUMENTS

| | | |
|---|---|---|
| DE | 3806686 A1 | 9/1989 |
| EP | 1589317 B1 | 11/2007 |
| EP | 2199732 A1 | 6/2010 |

OTHER PUBLICATIONS

Search Report for Application No. DE 20 2017 105 125.0, dated Jun. 19, 2018, 5 pages.

* cited by examiner

*Primary Examiner* — Natalie Huls
*Assistant Examiner* — Jermaine L Jenkins
(74) *Attorney, Agent, or Firm* — McCarter & English, LLP (57) ABSTRACT

An apparatus including
  an NC controller,
  a tactile system controlled by the NC controller and movable along a measurement axis,
  a workpiece receptacle for receiving a workpiece,
  a rotational drive for rotating the workpiece receptacle with the workpiece about an axis of rotation, and
  a contactlessly operating sensor device arranged on the tactile system and transferable from a first position into a second position by displacement relative to the tactile system.

20 Claims, 6 Drawing Sheets

DEVICE WITH A TACTILE SYSTEM AND WITH A CONTACTLESSLY OPERATING SENSOR, AND CORRESPONDING METHOD AND USE THEREOF

CROSS-REFERENCE TO RELATED APPLICATIONS

This application claims the benefit under 35 U.S.C. § 119(e) to German patent application no. DE 20 2017 105 125.0 filed Aug. 25, 2017, which is hereby expressly incorporated by reference as part of the present disclosure.

FIELD OF THE INVENTION

The present disclosure relates generally to an apparatus with a tactile system and with a contactlessly operating sensor, as well as a method for measuring a gear-workpiece and the use of such an apparatus for the measuring of a gear-workpiece.

BACKGROUND

In many technical fields, the shape of a component or material is an important feature.

Therefore, greatly varying measuring devices exist, which are usually equipped with a tactile sensor or scanner to be able to examine components. Roughness measuring devices are mentioned as an example, which are used to detect the roughness or peak-to-valley heights of surfaces of components. In roughness measuring devices, a tactile tip is typically guided over the surface to be examined. The result is a height signal recorded via the scanning travel, which is also referred to as a surface profile.

There are also measuring devices which are equipped with a tactile sensor comprising tactile ball pin, in order to be able to check the dimensional accuracy or the geometry of components, for example.

Figure 1:
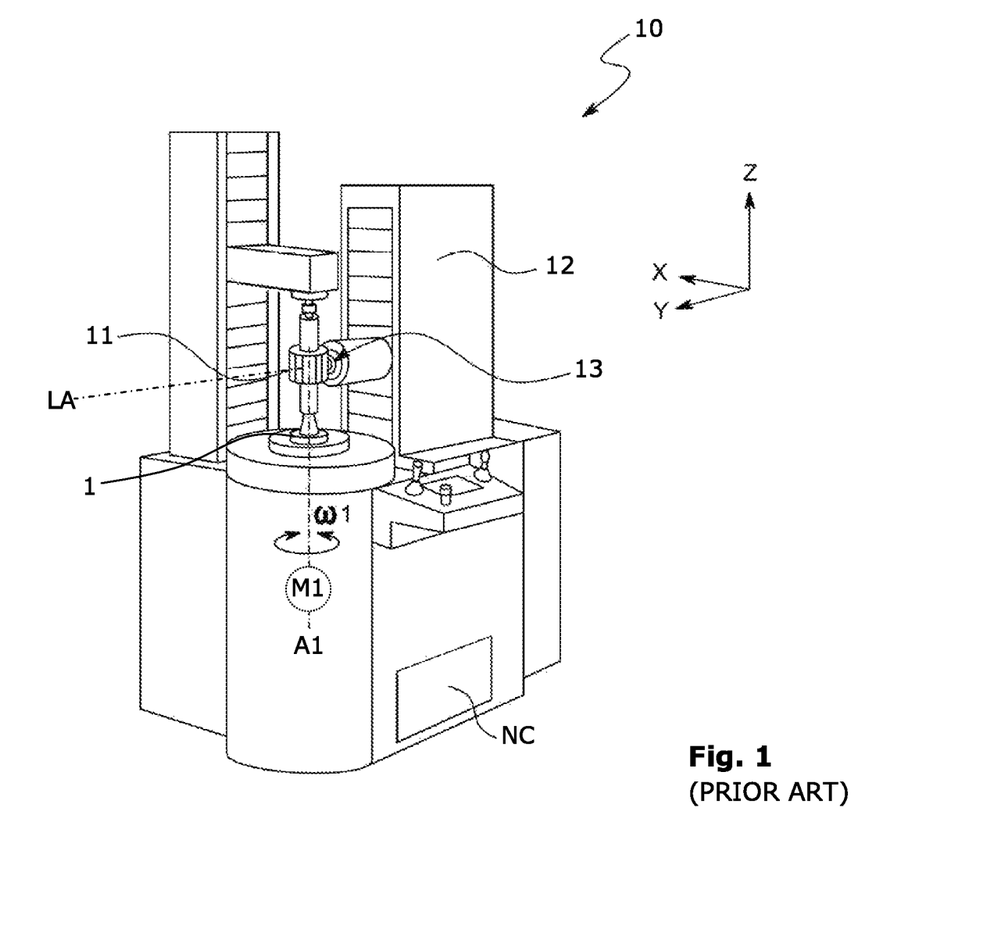
FIG. 1 shows a perspective view of an apparatus (in the form of a CNC measuring device), which is equipped with a tactile system or roughness measuring scanner of the prior art.

An exemplary measuring apparatus 10 (referred to as apparatus 10 herein) is shown in FIG. 1, which is designed comprising a tactile system 13 for measuring/examining gearwheels 11. The gearwheel 11, which is shown here, was chucked between a turntable comprising workpiece receptacle 1 and an optional counter holder in such a manner that it can be rotationally driven about an axis of rotation A1 standing vertically in space. The corresponding rotational movement is identified by ω1. The rotational drive is identified by M1. The apparatus 10 comprises a measurement axis assembly 12, on which the tactile system 13 is fastened. The apparatus 10 furthermore comprises an NC controller (identified herein by NC), which is designed for the numerically controlled control of the individual axes of the apparatus 10. Thus, for example, the tactile system 13 can be linearly displaced parallel to the Z axis. Moreover, the tactile system 13 can be extended parallel to the Y axis, to be able to infeed the scanner (not shown) of the tactile system 13 radially in the direction of the gearwheel 11. Vice versa, the scanner of the tactile system 13 can be retracted parallel to the Y axis. The measurement axis of the scanner is identified here with LA.

There is the need to expand the measuring options of such an apparatus 10, in order to make the apparatus 10 universally usable, or to be able to apply combined measuring methods.

It has also been shown that the tactile measuring procedures can sometimes be quite slow. The need to be able to offer additional measuring procedures in such an apparatus also exists for this reason.

Equipping such an apparatus 10 with replaceable tactile systems 13 is known. For this purpose, the tactile system 13 can comprise, for example, an adapter plate, which can be removed and replaced by another adapter plate. In this manner, for example, two different scanners can be used. Exemplary details of a corresponding device comprising removable measuring scanner can be inferred from patent specification EP1589317B1 of Klingelnberg GmbH.

However, there is also a need to be able to use different measuring systems in the same apparatus 10. Contactlessly operating sensor devices (for example, a sensor device operating using an optical sensor) are mentioned here as an example. The tactilely operating tactile system 13 can also be removed here and replaced by a contactlessly operating sensor device, which can be moved by the NC controller in the Y and Z direction in this case in the same manner as was described above in conjunction with FIG. 1.

Every change of the tactile system 13 or the sensor type requires a certain time expenditure, particularly because—depending on the configuration—adjustment steps can be necessary to be able to check and correct the measurement accuracy after every change.

SUMMARY

It is an object of the invention to provide a tactilely operating and a contactlessly operating measuring system, which requires less time expenditure for the change.

In addition, the disclosure herein relates to being able to carry out different measurements on gearwheels and on other three-dimensional structures, wherein measurements are to be performed with high accuracy as much as possible.

According to one aspect, an apparatus comprises an NC controller, a measuring system axis, which is movable by the NC controller along a measurement axis, a first measuring device, which is movable with the measuring system axis, a workpiece receptacle for arranging a workpiece in the device, a rotational drive for the workpiece receptacle, wherein the rotational drive enables the workpiece receptacle to be rotated together with the workpiece about an axis of rotation. The apparatus comprises a second measuring device in addition to the first measuring device. A tactile system is used as the first measuring device or as the second measuring device and a contactlessly operating sensor device is used as the respective other measuring device. The first measuring device and the second measuring device are arranged in relation to one another such that either the first measuring device or the second measuring device is transferable from a first position into a second position by a displacement procedure in relation to the measuring system axis.

According to another aspect, an apparatus comprises an NC controller, a tactile system which, controlled by the NC controller, is movable together with a measuring system axis parallel to a measurement axis, a workpiece receptacle for arranging a workpiece in the apparatus, and a rotational device for the workpiece receptacle, wherein the rotational drive enables the workpiece receptacle to be rotated together with the workpiece about an axis of rotation. The apparatus comprises, in addition to the tactile system, a contactlessly operating sensor device, which is arranged on the tactile system or the measuring system axis, on which the tactile system is fastened, such that this sensor device is transferable by a displacement procedure from a first position into a second position in relation to the measuring system axis.

According to some embodiments, a method comprises the following steps, which do not necessarily have to be carried out in the sequence given here:

arranging the workpiece in a receptacle of the apparatus, wherein an overall configuration is chosen where an NC-controlled measuring system axis is employed, which generally has a radial orientation relative to the axis of rotation of the workpiece, employing the tactile system for the tactile measuring of the workpiece, whereby, for the purpose of the tactile measuring, the tactile system is moved by means of the NC-controlled measuring system axis, whereby the contactlessly operating sensor device is jointly moved parallel to the measuring system axis together with the tactile system, and whereby the contactlessly operating sensor device during the tactile measuring is in a protected position (parked position), moving the contactlessly operating sensor device from the protected position (parked position) into a usage position by means of a displacement procedure relative to the measuring system axis, carrying out a measurement procedure employing the contactlessly operating sensor device, while the contactlessly operating sensor device is in the usage position, moving the contactlessly operating sensor device into the protected position (parked position).

According to one aspect, use of an apparatus comprises a contactlessly operating sensor device being kept in a protected position (parked position) during a tactile measurement procedure and making a displacement movement of the contactlessly operating sensor device relative to the measuring system axis in order to be brought into a usage position, to be able to carry out a contactless measurement procedure.

This configuration, which is referred to as a piggyback configuration hereafter, enables a rapid and accurate change between a tactilely operating measuring scanner and a contactlessly operating sensor and vice versa.

According to one aspect, either a first measuring device is displaceable in relation to a second measuring device, or a second measuring device is displaceable in relation to a first measuring device, or both a first measuring device and also a second measuring device are relatively displaceable.

This change is partially automated or fully automated in some embodiments.

The apparatus can be configured to operate in a first operating mode and in a second operating mode.

The apparatus can be configured to carry out a tactile measuring procedure using a tactile tip or tactile ball of the tactile system in the first operating mode, wherein the contactlessly operating sensor device is in the first position (parked position) during the first operating mode.

The apparatus is can be configured to carry out a contactlessly operating measuring procedure using the contactlessly operating sensor device in the second operating mode, wherein the contactlessly operating sensor device is in the second position (usage position) during the second operating mode.

The apparatus is can be configured to carry out a displacement procedure of the sensor device in relation to the tactile system partially automatically or fully automatically during a transition from the first operating mode to the second operating mode and/or during a transition from the second operating mode to the first operating mode.

The apparatus is can be configured to carry out the displacement procedure partially automatically or fully automatically.

Advantageous embodiments of the apparatus are disclosed herein.

The disclosed devices and methods may be used, for example, in conjunction with 1D, 2D, and 3D measuring apparatuses, as are known, for example, from published patent application EP2199732A1 of Klingelnberg AG.

According to one aspect, an apparatus includes an NC controller, a measuring system axis movable by the NC controller along a measurement axis, a first measuring device movable along the measuring system axis, a workpiece receptacle configured for receiving a workpiece, a rotational drive configured for rotating the workpiece receptacle and a workpiece received therein about an axis of rotation, and a second measuring device. Either the first measuring device or the second measuring device includes a tactile system, and the other of the first or second measuring device includes a contactlessly operating sensor device. The first measuring device and the second measuring device are configured such that either the first measuring device or the second measuring device is transferable from a first position to a second position by displacement relative to the measuring system axis, wherein when the measuring system axis is moved the sensor device is moved therewith.

According to another aspect, a method for measuring a workpiece or a gear-workpiece located in an apparatus that includes a first measuring device and a second measuring device. Either the first measuring device or the second measuring device includes a tactile system, and the other of the first and second device includes a contactlessly operating sensor device. The method further includes:

positioning a workpiece or gear workpiece in a receptacle of the apparatus, tactile measuring the workpiece or gear-workpiece using the tactile system, wherein said tactile measuring includes moving the tactile system with an NC-controlled measuring system axis, and jointly moving the contactlessly operating sensor device with the tactile system, wherein during the tactile measuring the contactlessly operating sensor device is in a protected position, moving the contactlessly operating sensor device from the protected position to a usage position by displacing the contactlessly operating sensor device relative to the measuring system axis, measuring the workpiece or gear-workpiece using the contactlessly operating sensor device while the contactlessly operating sensor device is in the usage position, and moving the contactlessly operating sensor device to the protected position.

According to another aspect, a method includes measuring a workpiece located in an apparatus using the apparatus. The apparatus includes an NC controller, a measuring system axis movable by the NC controller along a measurement axis, a first measuring device including a tactile system movable along the measuring system axis, a second measuring device including a contactlessly operating sensor device, a workpiece receptacle configured for receiving the workpiece, and a rotational drive configured for rotating the workpiece receptacle and the workpiece received therein about an axis of rotation. The first measuring device and the second measuring device are configured such that the second measuring device is transferable from a protected position to a usage position by displacement relative to the measuring system axis, and when the measuring system axis is moved the sensor device is moved therewith. The measurement further includes tactile measuring the workpiece using the tactile system, during which the contactlessly operating sensor device is in the protected position, displacing the contactlessly operating sensor device relative to the measuring system axis to the usage position, and contactlessly measuring the workpiece using the contactlessly operating sensor device.

Other objects, features, and/or advantages will become apparent in view of the following detailed description of the embodiments and the accompanying drawings.

However, while various objects, features and/or advantages have been described in this summary and/or will become more readily apparent in view of the following detailed description and accompanying drawings, it should be understood that such objects, features and/or advantages are not required in all aspects and embodiments.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are to be understood not to be limiting and which will be described in greater detail hereafter with reference to the drawings, wherein.

DETAILED DESCRIPTION

Terms, which are also used in relevant publications and patents, are used in conjunction with the present description. However, it is to be noted that the use of these terms is merely to serve for better comprehension. The inventive concepts and the scope of protection of the patent claims are not to be restricted in the interpretation by the specific selection of the terms. The invention may be readily transferred to other term systems and/or technical fields. The terms are to be applied accordingly in other technical fields.

In order, for example, to be able to analyze or scan the surface F, for example, the tooth flank of a tooth 7 (see also FIG. 2A), multiple measuring points along a line, curve, or surface F typically have to be scanned using a tactile system 13.

Exemplary embodiments of corresponding tactile systems 13 can be inferred, for example, from above-mentioned document EP2199732A1, wherein the reference to this prior art is not to be understood as restrictive. This is merely an example of a scanner or tactile system 13, in the environment of which an apparatus disclosed herein can be used.

Figure 2A:
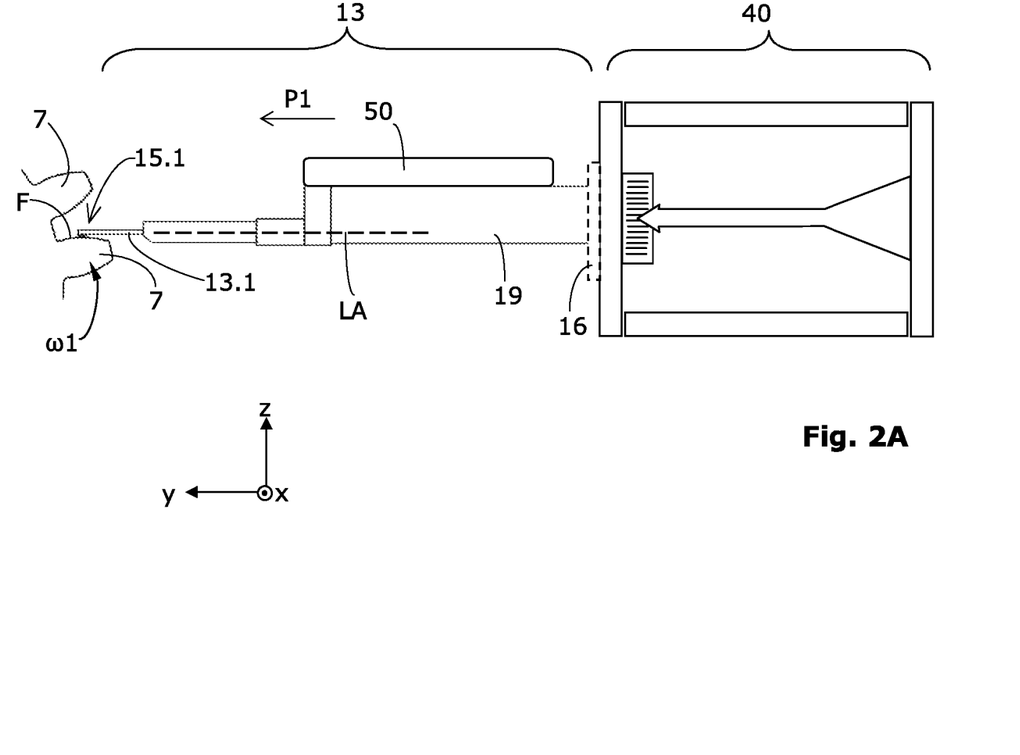
FIG. 2A shows the schematic structure of a single-coordinate scanning head combined with a roughness measuring scanner of the prior art and with a contactlessly operating sensor, wherein the roughness measuring scanner is used on a gearwheel at the moment shown.
Figure 2B:
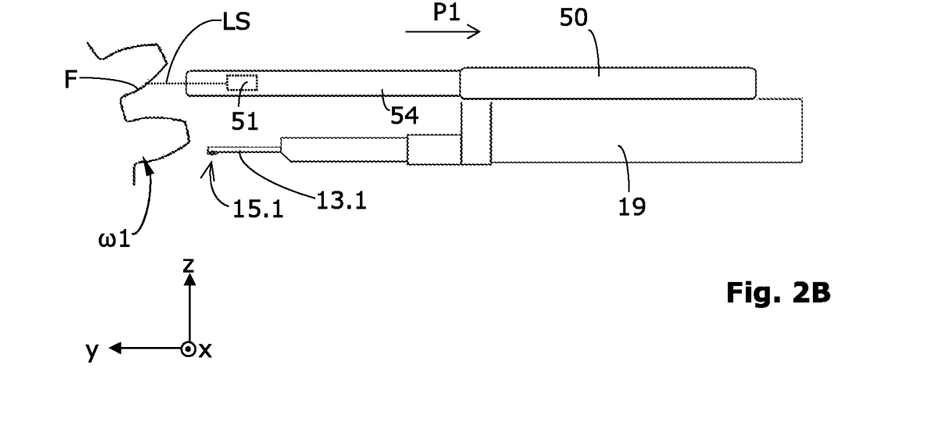
FIG. 2B shows the apparatus illustrated in FIG. 2A, wherein the contactlessly operating sensor is used on the gearwheel at the moment shown.

The tactile system 13 shown by way of example comprises, for example, a tactile tip 15.1, which is seated in the region of the extreme end of a tactile arm 13.1, as shown in FIGS. 2A and 2B. The tactile system 13 can also comprise a tactile sensor comprising a tactile ball tip 15.2 instead of a tactile tip 15.1 in some embodiments, as shown in FIGS. 3A, 3B, and 4A, 4B.

The tactile arm 13.1 can have a longitudinal extension parallel to a longitudinal axis LA in at least some embodiments (LA extends here parallel to the y axis of an x-y-z coordinate system).

Furthermore, the tactile system 13 can comprise, for example, a lever-type mounting or suspension 40 in some embodiments (see, for example, FIG. 2A and EP2199732A1), configured for converting small deflections of the tactile tip 15.1 or the tactile arm 13.1 in the z direction into corresponding deflections at an opposing end of a lever arm.

A lever-type mounting 40 of the tactile arm 13.1 can be used, which performs a mechanical 1:1 conversion of the deflections of the tactile tip 15.1 in the Z direction.

However, a lever-type mounting 40 of the tactile arm 13.1 can also be used, which performs an enlarging conversion of the deflections of the tactile tip 15.1 in the Z direction. In this case, a small deflection of the tactile tip 15.1 in the Z direction is converted into a larger deflection of the opposing end of the tactile arm 13.1 in the Z direction. A step-down conversion of the lever-type mounting 40 can also be used, however.

Depending on the embodiment, the tactile arm 13.1 can be mounted like a lever (for example, in the interior of a housing 19) or another section or region of the tactile system 13 (for example, a hollow cylinder) can be used to accommodate the lever-type mounting of the tactile arm 13.1.

The tactile arm 13.1 does not have to be arranged off-center on the tactile system 13, as shown in FIGS. 2A, 2B. It can also be arranged centrally (concentrically) on the tactile system 13, as shown in FIGS. 3A, 3B, and 4A, 4B.

Instead of a tactile tip 15.1, as shown in FIGS. 2A, 2B, the tactile system 13 can also comprise a tactile ball 15.2

(referred to as a tactile ball tip 15.2), for example, as shown in FIGS. 3A, 3B, and 4A, 4B and as described in EP1589317B1.

According to one aspect, in addition to the tactile system 13, which can be used as described, for example, as a roughness measuring scanner, a contactlessly operating sensor device 50 can be arranged on the tactile system 13 or on the axis of the tactile system 13.

Since the principle may also be reversed, reference is also made here to a first measuring device and a second measuring device. Either a tactile system 13 is used as the first measuring device and a contactlessly operating sensor device 50 is used as the second measuring device, or a tactile system 13 is used as the second measuring device and a contactlessly operating sensor device 50 is used as the first measuring device.

In some embodiments, an optical sensor 51 is used as a component of the contactlessly operating sensor device 50. The position of such an optical sensor 51 is shown schematically and by way of example in FIG. 2B. The optical sensor 51 is seated here, for example, in the interior of a movable part 54 of the sensor device 50.

In FIG. 2A, the sensor device 50 is arranged, for example, on the housing 19 of the tactile system 13. The sensor device 50 is located in an inactive state in FIG. 2A (this state is also referred to as the parked position). It is indicated by the arrow P1 that the sensor 50 can be extended in the example shown by a linear displacement movement. In the extended state (also called active state or usage position), the sensor device 50 can be used for measuring.

In FIG. 2B, the sensor device 50 is shown in the extended state. Overall, in the example shown, the relative distance (parallel to the y axis) between the tactile system 13 and the gearwheel 11 was enlarged, so that the tactilely operating tactile arm 13.1 does not collide with the rotating gearwheel 11. The rotational movement of the gearwheel 11 is identified in the figures with ω1. The light beam or beam path LS is shown in FIG. 2B by a dotted line, which is emitted here by the optical sensor 51 in the direction of the surface F. It is indicated by the arrow P1 that the sensor device 50 can be retracted in the example shown by a linear displacement movement.

In the exemplary embodiment of FIGS. 2A, 2B, the sensor device 50 is connected in a piggyback configuration to the housing 19 and the sensor device 50 is designed for executing a relative linear displacement movement P1.

The sensor device 50 can also be connected in some embodiments to the NC-controlled axis of the tactile system 13, instead of being seated on the housing of the tactile system 13.

The NC-controlled axis of the device 10 is also referred to here as the measuring system axis Y.

A plate 16 is indicated by way of example in FIG. 2A, which is used as a type of mechanical interface for attaching the tactile system 13. The mounting or suspension 40 and the plate 16 are associated here with the NC-controlled measuring system axis Y. The sensor device 50 can be arranged in some embodiments, for example, on the plate 16 of the NC-controlled measuring system axis Y.

Instead of a solely linear displacement movement, in some embodiments a pivot-displacement movement, tilt-displacement movement, or rotation-displacement movement can also be used, in order to displace the sensor device 50 from a protected position (parked position) into an active position (usage position).

A combination of at least two of the mentioned displacement movements can also be used (for example, a rotation-displacement movement combined with a linear displacement movement).

The term "displacement movement" refers here to a relative displacement of the sensor device 50, or a part 54 of the sensor device 50 in relation to the measuring system axis Y.

The sensor device 50 moves in solidarity with the measuring system axis Y, when it is set into motion, for example, by an NC controller (identified with NC in FIG. 1).

Figure 3A:
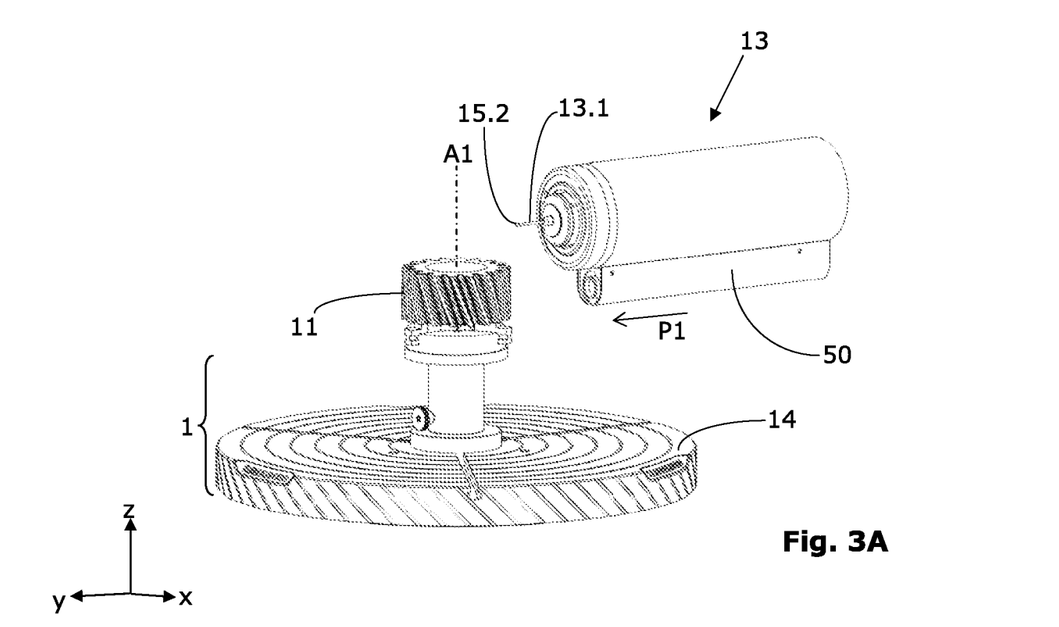
FIG. 3A shows a perspective view of the measuring range of a further apparatus, which comprises a tactile system comprising a tactile ball and a contactlessly operating optical sensor, wherein the tactile system is prepared for use on a gearwheel at the moment shown.
Figure 3B:
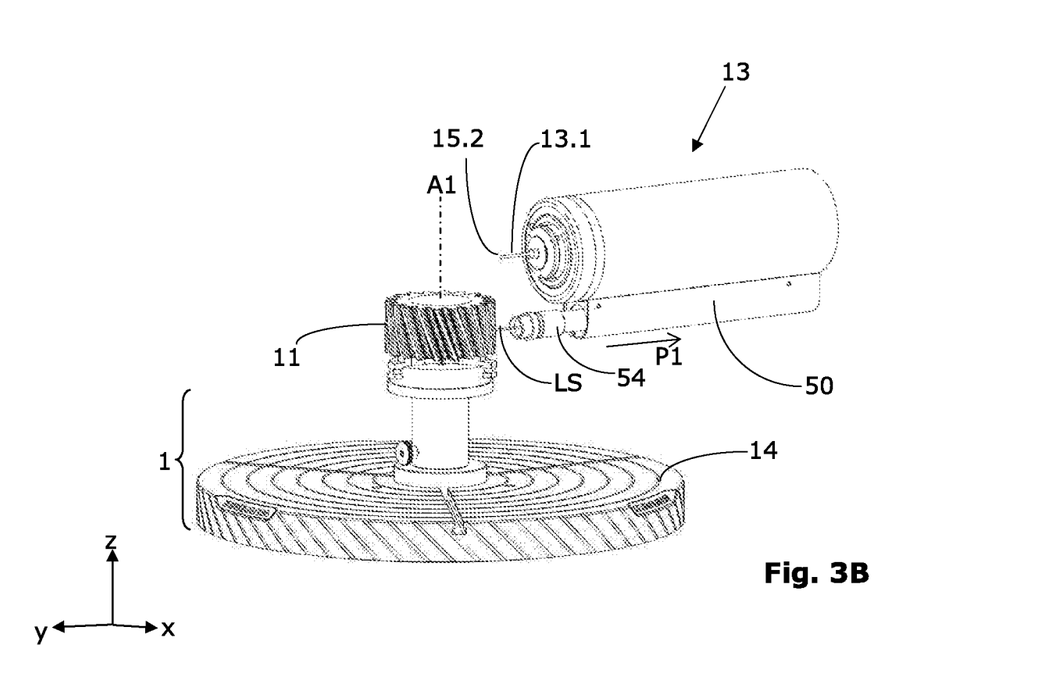
FIG. 3B shows the apparatus illustrated in FIG. 3A, wherein the contactlessly operating optical sensor is used on the gearwheel at the moment shown.

A further embodiment is shown in FIGS. 3A and 3B, wherein only some of the details of the measuring environment of a device 10 are shown. A sensor device 50 can also be seen here, which is connected to a tactile system 13. The tactile system 13 has a centrally (concentrically) mounted tactile tip 13.1 comprising tactile ball 15.2 here (for example, in the form of a ruby ball). FIG. 3A shows the sensor device 50 in the retracted (inactive) state (parked position). The tactile tip 13.1 comprising tactile ball 15.2 is not engaged with the gearwheel 11 at the moment shown but could be used for tactile measurement at any time.

FIG. 3B shows the sensor device 50 in the extended (active) state (usage position) and the light beam LS is incident on a surface F of the gearwheel 11.

The arrow P1 also indicates the relative displacement movement in FIGS. 3A and 3B.

Figure 4A:
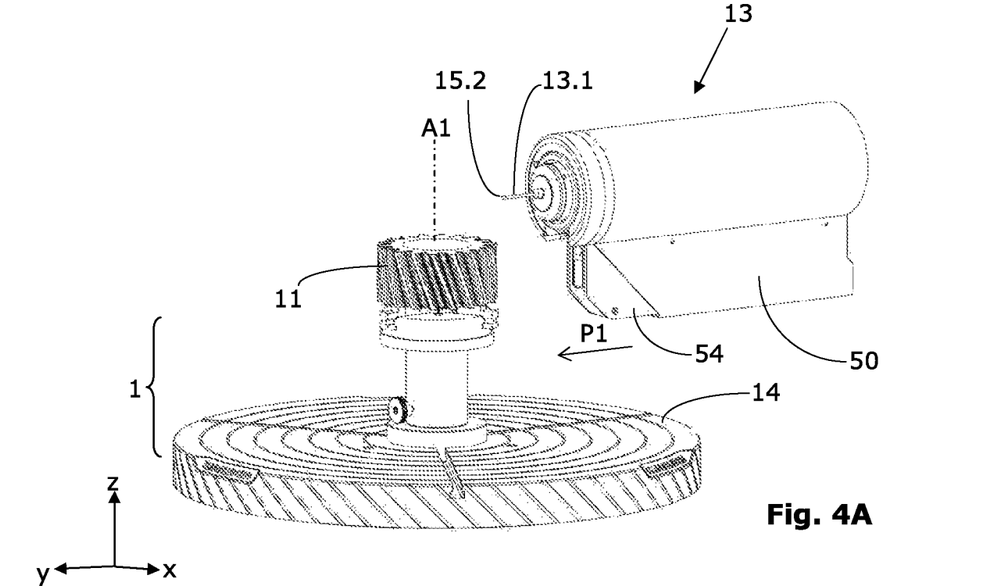
FIG. 4A shows a perspective view of the measuring range of a further apparatus, which comprises a tactile system comprising a tactile ball and a contactlessly operating optical sensor, wherein the tactile system is prepared for use on a gearwheel at the moment shown.
Figure 4B:
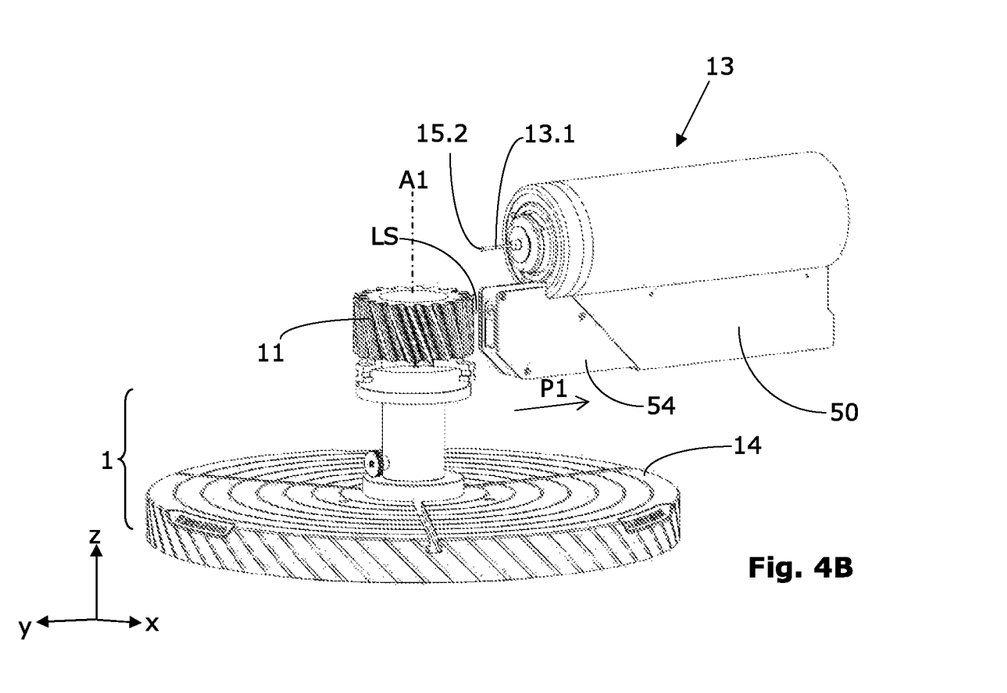
FIG. 4B shows the apparatus illustrated in FIG. 4A, wherein the contactlessly operating optical sensor is used on the gearwheel at the moment shown.
Figure 4C:
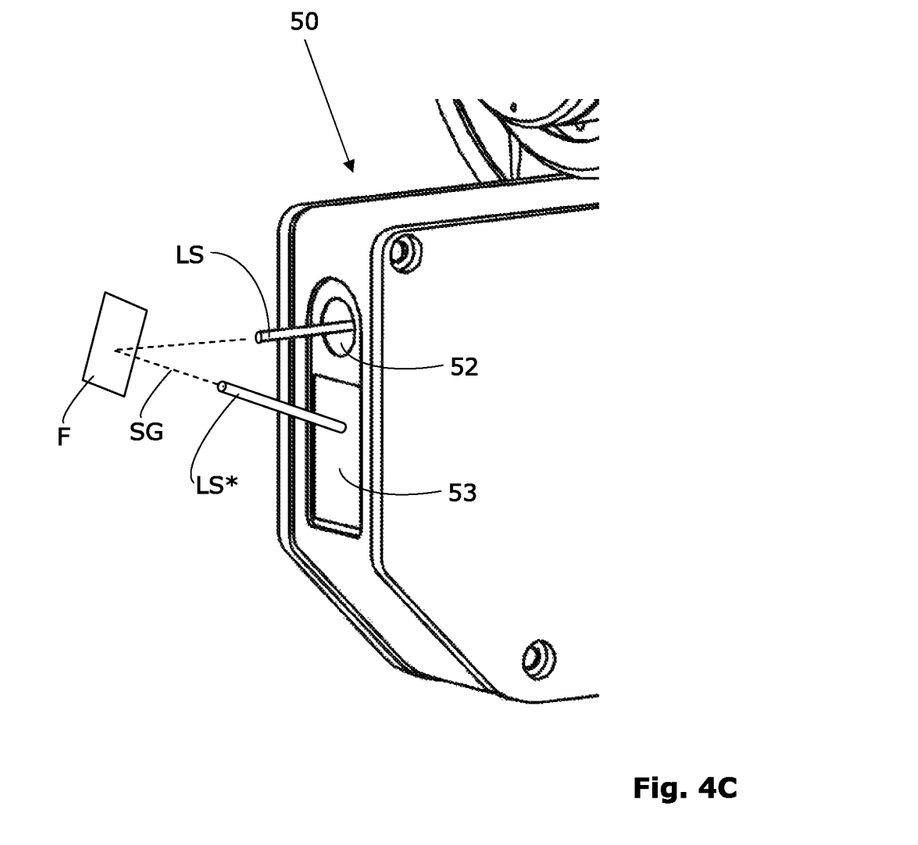
FIG. 4C shows a portion of the front region of the optical sensor of the device illustrated in FIG. 4B.

A further embodiment is shown in FIGS. 4A, 4B, and 4C. A sensor device 50 can also be seen here, which is connected to a tactile system 13. The tactile system 13 has a centrally (concentrically) mounted tactile tip 13.1 comprising tactile ball 15.2 here (for example, in the form of a ruby ball). FIG. 4A shows the sensor device 50 in the retracted (inactive) state (parked position). The tactile tip 13.1 comprising the tactile ball 15.2 is not engaged with the gearwheel 11 at the moment shown but could be used for tactile measurement at any time.

FIG. 4B shows the sensor device 50 in the extended (active) state (usage position) and the light beam LS is incident on a surface F of the gearwheel 11.

In contrast to FIGS. 3A, 3B, this is a sensor device 50 which operates according to the triangulation principle. Such a sensor device 50 comprises, depending on the system, an optical emitter 51 (for example, a laser light source) and an optical detector 63, which are arranged spatially having a defined distance and angle in relation to one another, as indicated by way of example and schematically in FIG. 6.

FIG. 4C shows an enlarged portion of the front region of the device 50 of FIG. 4B. It can be seen in this illustration that an optional optical lens 52 for the emitted light beam LS is provided on the device 50, through which the light beam LS is radiated in the direction of the gearwheel 11 (not shown). Furthermore, the device 50 comprises an opening 53 to receive light and conduct it in the direction of an optical detector 63 (not shown).

To be able to schematically show the triangulation principle, a beam path SG is shown in simplified form in FIG. 4C, which represents the light beam LS which is emitted by the optical emitter 51 of the device 50, is reflected on a surface F, and is conducted back as a beam bundle LS* through the opening 53 to the detector 63.

Since both simple (for example, linear) displacement movements or also more complex displacement movements are possible, the corresponding procedure is referred to here in general as a displacement procedure. Depending on the embodiment, the displacement procedure can comprise a single displacement movement. However, the displacement movement can also, depending on the embodiment, comprise a superposition of at least two displacement movements, which are executed simultaneously, overlapping in time, or in succession.

The device 10 may be designed such that the displacement procedure takes place partially automatically or fully automatically.

Displacement procedures are referred to here as partially automatic if, for example,
the displacement procedure is manually triggered (e.g., by actuating a scanner or by disengaging a lock), and/or
the sensor device 50 is moved manually, to then be automatically locked or pressed against a stop, and/or
the sensor device 50 is automatically moved, to then be manually locked or pressed against a stop.

Displacement procedures are referred to as fully automatic here if, for example,
the displacement procedure is executed completely automatically (without manual intervention).

Specifically, a method for measuring a workpiece 11, in particular a gear-workpiece 11, in an apparatus 10 is concerned. This apparatus 10 comprises a first measuring device and a second measuring device, as already mentioned. In accordance with this method, a tactile system 13 is used as first measuring device or as second measuring device, and a contactlessly operating sensor device is used as the respective other measuring device. The method comprises the following steps:
arranging the workpiece 11 in a receptacle 1 of the apparatus 10, wherein an overall configuration is chosen where an NC-controlled measuring system axis Y is employed, which generally has a radial orientation relative to the axis of rotation A1 of the workpiece 11;
employing the tactile system 13 for the tactile measuring of the workpiece 11,
whereby, for the purpose of the tactile measuring, the tactile system 13 is moved by means of (the drive of) the NC-controlled measuring system axis Y,
whereby the contactlessly operating sensor device 50 is jointly moved parallel to the measuring system axis Y together with the tactile system 13, and
whereby the contactlessly operating sensor device 50 during the tactile measuring is in a protected position (parked position), moving the contactlessly operating sensor device 50 from the protected position (parked position) into a usage position by means of a displacement procedure P1 relative to the measuring system axis Y,
carrying out a measurement procedure employing the contactlessly operating sensor device 50, while the contactlessly operating sensor device 50 is in the usage position, moving the contactlessly operating sensor device 50 into the protected position (parked position).

A mechanical movement unit 66 comprising electromotive drive 60, an electromagnetic drive, a pneumatic drive 66, or a hydraulic drive is used in some embodiments in order to execute partially automatic or fully automatic movements.

Figure 5:
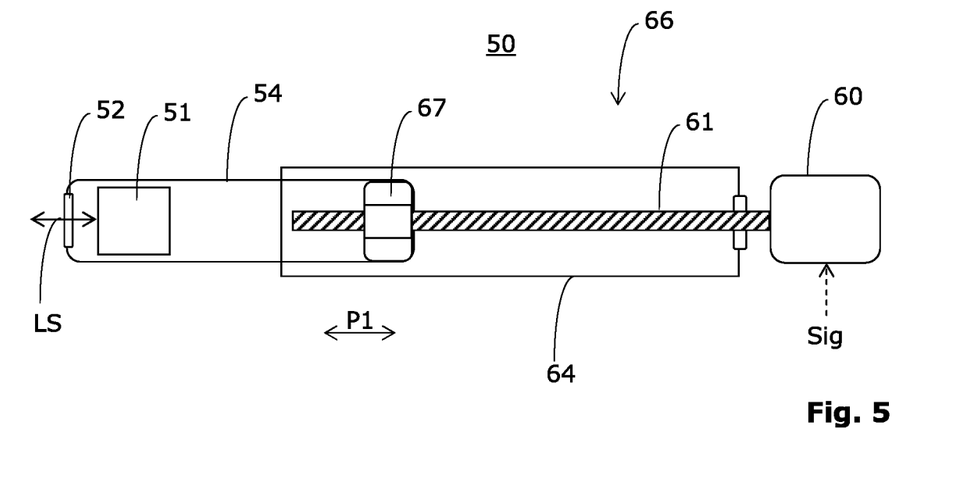
FIG. 5 shows a schematic detail of a further apparatus.

The basic principle of a mechanical movement unit 66 comprising electromotive drive 60 is shown in FIG. 5. This is a movement unit 66 here, which is coupled to a movable part 54 of the sensor device 50 such that the movable part 54 can be linearly displaced in relation to the measuring system axis Y. For example, a spindle shaft 61 can be connected to an electric motor 60. In the example shown, a spindle nut 67, which is displaced linearly to the left or right depending on the rotational direction of the spindle shaft 61, is seated on the spindle shaft 61. In the example shown, the movable part 54 of the sensor 50 is connected to the spindle nut 67. The movable part 54 is thus displaced to the left or right in solidarity with the spindle nut 67. An optical sensor 51 (for example, comprising a sensor 51 comprising integrated sensor and detector), which is seated behind the optional lens 52, is shown here in the front region of the movable part 54. LS represents the emitted and the received light beam here.

An approach is shown in FIG. 5, in which the spindle shaft 61 is rotationally driven by the drive 60 to displace the spindle nut 67 in relation to the spindle shaft 61. This functional principle can also be reversed by the spindle nut 67 being rotationally driven to displace the spindle shaft 61 in relation to the spindle nut 67.

Figure 6:
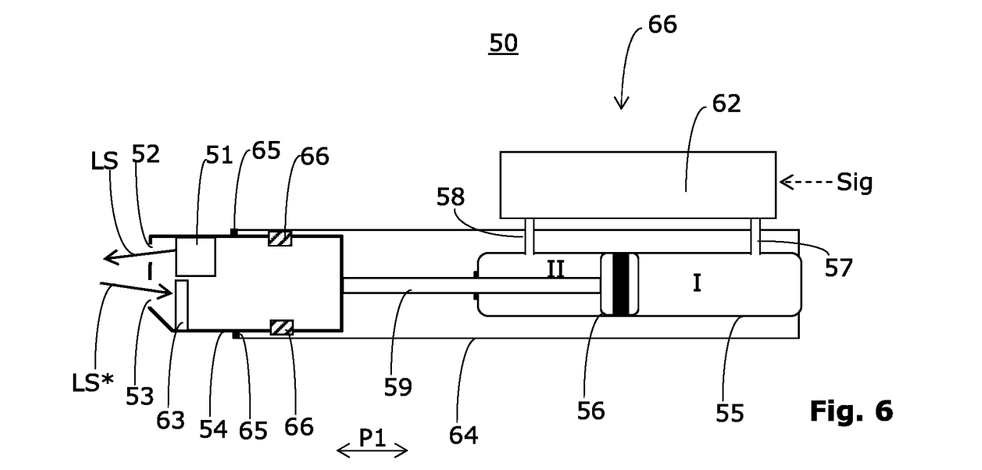
FIG. 6 shows a schematic detail of a further apparatus.

The basic principle of a movement unit 66 comprising servo-pneumatic drive 62 is shown in FIG. 6. The movement unit 66 is also designed for a relative linear movement in this case. The movement unit 66 comprises a cylinder 55 comprising movably mounted piston 56. Two chambers I and II result in the cylinder 55. The chamber I is provided with a first line 57 and the chamber II is provided with a second line 58. The servo-pneumatic drive 62 places the chamber I under pressure via the line 57 at the moment shown. The piston 56 is thus displaced to the left and the chamber II reduces its volume. Compressed air flows out through the line 58. The piston 56 can be connected, for example, via a rod 59 to the movable part 54, as schematically indicated in FIG. 6. An optical emitter 51 and an optical detector 63 can be arranged in the interior of the movable part 54, similarly to FIGS. 4A, 4B, 4C. The optical emitter 51 can be seated behind an aperture 52 in such a manner that a light beam LS is emitted in the direction of gearwheel 11 (not shown).

To be able to move the movable part 54 out of the usage position back into the parked position, pressure is applied to the chamber II through the line 58, while air flows out from the chamber I and through the line 57. Corresponding valves are provided which can be switched by the drive 62. These valves are not shown here.

Stops 65 can be provided, for example, in the region of the left end on the housing part 64 of the sensor device 50, which is mechanically connected to the tactile system 13. In FIG. 6, these stops 65 are shown as small black blocks. Counterparts 66 can be provided on the movable part 54, which are shown in FIG. 6 as shaded blocks. A moment shortly before reaching the usage position is shown in FIG. 6. The counterparts 66 therefore do not yet press against the stops 65 at the moment shown.

It is important that the drive together with the movement unit ensure that the sensor device 50 is moved precisely into the desired usage position and is held in this usage position during the measurement.

In some embodiments, a measuring system (for example, a distance measuring system) can therefore be used in order to be able to detect whether the sensor device 50 was moved precisely into the desired usage position, before an optical measurement is then performed.

In some embodiments, a precisely defined stop is provided (as described, for example, in conjunction with FIG. 6), in order to define the relative position 50 exactly in relation to the axis of the tactile system 13. The NC controller thus "knows" the accurate position of the sensor device 50, after it has been transferred into the usage position.

In some embodiments, an (electro-) magnet is arranged between the housing part 64 of the sensor device, which is mechanically connected to the tactile system 13, and the movable part 54, in order to hold the sensor device 50 in the usage position. During the retraction of the sensor device 50, either the magnetic force of the magnet has to be overcome, or the magnetic force first has to be reduced or turned off, if an electromagnet is used.

In some embodiments, a switch, sensor, scanner, or signal generator is arranged on the tactile system 13 in such a manner that reaching the usage position can be transmitted via signal, for example, to the NC controller or to a separate drive controller.

The drive 60 or 62 is designed in some embodiments such that it is controllable by a controller of the device 10. A signal line, which is provided with the reference sign Sig, is shown in FIGS. 5 and 6. The optional ability to control by a controller is to be schematically represented by this signal line.

The drive 60 or 62 is controlled in some embodiments by the NC controller NC of the device 10.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. An apparatus comprising
an NC controller,
a measuring system axis movable by the NC controller along a measurement axis,
a first measuring device movable with the measuring system axis,
a workpiece receptacle configured for receiving a workpiece,
a rotational drive configured for rotating the workpiece receptacle and a workpiece received therein about an axis of rotation, and
a second measuring device,
wherein one of the first measuring device or the second measuring device includes a tactile system, and
the other of the first or second measuring device includes a contactlessly operating sensor device,
wherein the first measuring device and the second measuring device are configured such that either the first measuring device or the second measuring device is transferable from a first position to a second position by displacement relative to the measuring system axis, and
wherein when the measuring system axis is moved the sensor device is moved therewith.

2. The apparatus according to claim 1, wherein the tactile system comprises a housing or casing and the sensor device is connected to the housing or casing and is movable in unison with the tactile system.

3. The apparatus according to claim 2, wherein the sensor device is connected in a piggyback configuration to the housing or casing and configured to execute a relative linear displacement movement.

4. The apparatus according to claim 1, wherein the sensor device is connected to the measuring system axis and is movable in unison with the measuring system axis.

5. The apparatus according to claim 1, wherein the sensor device comprises a movable part and a movement unit comprising a drive configured to displace the movable part relative to the measuring system axis.

6. The apparatus according to claim 1, wherein the sensor device comprises a movable part, a spindle shaft and a spindle nut, wherein the spindle shaft is rotationally drivable by a drive to displace the spindle nut relative to the spindle shaft, or the spindle nut is rotationally drivable to displace the spindle shaft relative to the spindle nut.

7. The apparatus according to claim 1, wherein the sensor device comprises a movable part and a pneumatic or hydraulic movement unit comprising a drive configured to displace the movable part using fluid pressure.

8. The apparatus according to claim 6, wherein the drive is controllable by the NC controller.

9. The apparatus according to claim 1, wherein the apparatus is operable in a first operating mode and in a second operating mode.

10. The apparatus according to claim 9, configured to, in the first operating mode, tactile measure using a tactile tip or a tactile ball of the tactile system, wherein the contactlessly operating sensor device is located in the first position during the first operating mode.

11. The apparatus according to claim 9, configured to, in the second operating mode, contactlessly measure in the second position during the second operating mode.

12. The apparatus according to claim 1, further configured to displace said either the first measuring device or the second measuring device relative to the measuring system axis partially automatically.

13. The apparatus according to claim 12, wherein said partially automatic displacing includes one or more of
manual triggering of the displacement, or
manual movement of the sensor device so as to be automatically locked or pressed against a stop, or
automatic movement of the sensor device so as to be manually locked or pressed against a stop.

14. The apparatus according to claim 1, further configured to displace said either the first measuring device or the second measuring device relative to the measuring system axis fully automatically.

15. The apparatus according to claim 14, wherein said fully automatic displacing includes completely automatic displacement.

16. The apparatus according to claim 1, wherein the sensor device is connected to the measuring system axis.

17. The apparatus according to claim 1, wherein the first position defines a protected position and the second position defines an active position, and the apparatus is configured to displace the sensor device from the protected position to the active position by one or more of
linear displacement movement, or
pivot-displacement movement, or
tilt-displacement movement, or
rotation-displacement movement.

18. The apparatus according to claim 1, further including one or more of a switch, sensor, tactile element, or signal generator located on the tactile system, wherein the second position defines a usage position, and the apparatus is configured to transmit a signal to the NC controller or to a separate drive controller that the sensor device has reached the usage position.

19. A method for measuring a workpiece or a gear-workpiece located in an apparatus comprising a first measuring device and a second measuring device, wherein one of the first measuring device or the second measuring device includes a tactile system, and the other of the first or second device includes a contactlessly operating sensor device, the method comprising:

positioning a workpiece or gear-workpiece in a receptacle of the apparatus,     tactile measuring the workpiece or gear-workpiece using the tactile system, wherein said tactile measuring includes moving the tactile system with an NC-controlled measuring system axis, and jointly moving the contactlessly operating sensor device with the tactile system, wherein during the tactile measuring the contactlessly operating sensor device is in a protected position,     moving the contactlessly operating sensor device from the protected position to a usage position by displacing the contactlessly operating sensor device relative to the measuring system axis,     measuring the workpiece or gear-workpiece using the contactlessly operating sensor device while the contactlessly operating sensor device is in the usage position, and     moving the contactlessly operating sensor device to the protected position.

20. A method comprising:

measuring a workpiece located in an apparatus using said apparatus, said apparatus comprising     an NC controller,     a measuring system axis movable by the NC controller along a measurement axis,     a first measuring device including a tactile system movable along the measuring system axis,     a second measuring device including a contactlessly operating sensor device,     a workpiece receptacle configured for receiving the workpiece, and     a rotational drive configured for rotating the workpiece receptacle and the workpiece received therein about an axis of rotation,     wherein the first measuring device and the second measuring device are configured such that the second measuring device is transferable from a protected position to a usage position by displacement relative to the measuring system axis, and     wherein when the measuring system axis is moved the sensor device is moved therewith, wherein the measuring step includes tactile measuring the workpiece using the tactile system, wherein the contactlessly operating sensor device is in the protected position, displacing the contactlessly operating sensor device relative to the measuring system axis to the usage position, and contactlessly measuring the workpiece using the contactlessly operating sensor device.

* * * * *